US012658057B2

(12) United States Patent
Kazanbas et al.

(10) Patent No.: US 12,658,057 B2
(45) Date of Patent: Jun. 16, 2026

(54) AVIONIC COMPUTER ARCHITECTURE

(71) Applicant: TUSAS—TURK HAVACILIK VE UZAY SANAYII ANONIM SIRKETI, Kahramankazan/Ankara (TR)

(72) Inventors: Mehmet Cemil Kazanbas, Kahramankazan/Ankara (TR); Yigit Can, Kahramankazan/Ankara (TR)

(73) Assignee: TUSAS- TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 143 days.

(21) Appl. No.: 18/689,961

(22) PCT Filed: Jun. 27, 2022

(86) PCT No.: PCT/TR2022/050664
§ 371 (c)(1),
(2) Date: Mar. 7, 2024

(87) PCT Pub. No.: WO2023/043406
PCT Pub. Date: Mar. 23, 2023

(65) Prior Publication Data
US 2025/0131829 A1 Apr. 24, 2025

(30) Foreign Application Priority Data
Sep. 15, 2021 (TR) ............................... 2021/014430

(51) Int. Cl.
G08G 5/21 (2025.01)
G06F 8/65 (2018.01)
G06F 9/455 (2018.01)

(52) U.S. Cl.
CPC ................. G08G 5/21 (2025.01); G06F 8/65 (2013.01); G06F 9/455 (2013.01)

(58) Field of Classification Search
CPC ..... G06F 8/60; G06F 8/65; G06F 9/06; G06F 9/44; G06F 9/445; G06F 9/455;
(Continued)

(56) References Cited

U.S. PATENT DOCUMENTS 8,570,192 B2 * 10/2013 McLoughlin ............ G08G 5/21
701/14
2010/0318834 A1 12/2010 Planche
(Continued)

FOREIGN PATENT DOCUMENTS

EP 2710473 A1 3/2014
EP 3345832 A1 7/2018
(Continued)

OTHER PUBLICATIONS

International Search Report and Written Opinion for corresponding PCT application No. PCT/TR2022/050664 mailed Dec. 5, 2022.
(Continued)

*Primary Examiner* — Brandon Z Willis
(74) *Attorney, Agent, or Firm* — Notaro, Michalos & Zaccaria P.C.

(57) ABSTRACT
An operational flight software for air and/or space vehicles is disclosed that provides for the control and management of avionic systems, where at least one processor unit enables the operational flight software to be processed and at least one data supply unit receives the data from the physical environment or generates the data wherein the data is to be used in the operational flight software executed in the processor unit and at least one execution unit enables the execution of commands generated by the operational flight software processed by the processor unit, and an operating system is processed within the processor unit that controls and manages the operational flight software, the data supply unit and the execution unit.

10 Claims, 3 Drawing Sheets

(58) Field of Classification Search
    CPC .. G06F 15/76; G06F 15/7839; G06F 15/7867;
                  G06F 15/80; G08G 5/21; G05D 2101/00;
                     G05D 2109/20; G05D 2109/40; B64U
                                20/80; B64U 20/83
    See application file for complete search history.

(56)               References Cited

U.S. PATENT DOCUMENTS

| | | | |
|---|---|---|---|
| 2019/0026204 A1* | 1/2019 | Hotra .................. | G06F 11/3668 |
| 2020/0310947 A1* | 10/2020 | Watson ............... | G06F 11/3684 |
| 2022/0165163 A1* | 5/2022 | Miller ..................... | G08G 5/56 |

FOREIGN PATENT DOCUMENTS

| | | |
|---|---|---|
| KR | 20120011123 A | 2/2012 |
| TR | 201913054 A2 | 3/2021 |
| WO | 2012158081 A1 | 11/2012 |
| WO | 2021040652 A2 | 3/2021 |

OTHER PUBLICATIONS

International Preliminary Report on Patentability for corresponding PCT application No. PCT/TR2022/050664 completed Aug. 17, 2023.

* cited by examiner

AVIONIC COMPUTER ARCHITECTURE

The present invention relates to an avionic computer architecture with interfaces to isolate the components required for the avionic computer to run.

The avionic computer architecture used in air and/or space vehicles provides communication, navigation, indication, recording and control operations. Components such as processors, operating systems, sensors, devices used in the avionic computer and the architecture are hardware-specific, wherein as a result of the modifications made in the hardware, the architectural design is repeated and subjected to testing and certification processes.

The Turkish patent document TR201913054, which is included in the known-state of the art, discloses a software-independent avionic architecture. The avionic computer architecture comprises at least one processing unit, at least one sensing unit that enables the data used in the execution of a flight control algorithm to be retrieved from a physical environment, at least one execution unit that enables execution of commands sent by the processing unit, at least one programmable hardware unit located in connection with the sensing unit and the execution unit, which enables the processing of data from the sensing unit and the transmission of air vehicle control commands to the execution unit, at least one temporary memory unit located in connection with the processor unit, capable of exchanging data with the processing unit, and storing the data processed by the processing unit.

With an avionic computer architecture according to the present invention, the data required to be controlled can be handled without having to deal with the details necessary for the use of the hardware. Dependency of the processor and hardware components is eliminated, so that a little modification is sufficient to operate the new hardware. Thus, a faster, time-saving, easily configurable and practical avionic computer architecture is realized.

The avionic computer architecture realized to achieve the object of the invention and defined in the first claim and the claims dependent thereon comprises an operational flight software provided in air vehicles, i.e. unmanned aerial vehicles, aircrafts and helicopters and/or space vehicles, i.e. satellites, which is carried out in at least one processor unit of the avionic computer and provides the control and management of avionic systems such as communication, navigation, display management. At least one data supply unit is provided, which enables the function of detecting the data from the physical environment or producing the data to be processed in the operational flight software, and transmits the data obtained to the operational flight software in the processor unit. Thanks to the data processed in the operational flight software, commands required for the continuation of the flight are transmitted to at least one execution unit, such that the generated commands are carried out in the execution unit. Thanks to an operating system run in the processor unit, data transfer between operational flight software, data supply unit and execution unit is checked, and their operations relative to each other is managed to provide a co-ordinational operation.

The avionic computer architecture according to the invention comprises at least one virtual manager which is created by virtualizing at least one of the data supply unit, the execution unit and the operating system within the processor unit by a user, and enables data exchange between the operational flight software and the data supply unit, the execution unit and/or the operating system that have been virtualized in the processor unit.

In an embodiment of the invention, the avionic computer architecture comprises the virtual manager which converts the data into a format to be perceived by an updated operational flight software that has been previously created by a user by updating the operational flight software, in order to transfer data with the updated operational flight software, wherein the virtual manager is created by the user by virtualizing at least one of the data supply unit, the execution unit and the operating system in the processor unit, wherein the virtual manager is a different library from the updated operational flight software, wherein if the user provides modifications/additions/removals for any of the data supply unit, execution unit or operating system, the virtual manager allows data transfer between the updated operational flight software and the part that is modified/added/removed, wherein the virtualized part of the virtual manager is subject to user certification process. A faster certification process can be performed, since the software of the virtual manager part, which ensures data transmission only for the part of the virtual manager that is modified/added/removed, is updated by the user and subjected to the certification process again, wherein the virtual manager transfers data between the updated operational flight software and the data supply unit, execution unit or operating system which have been provided with modifications/additions/removals.

In an embodiment of the invention, the avionic computer architecture comprises at least one virtual interface manager created by virtualizing the data supply unit by the user; at least one virtual device manager created by virtualizing the data supply unit and the execution unit by the user; and at least one virtual operating manager created by virtualizing the operating system. The virtual interface manager, virtual device manager and virtual operating manager layers, which are created together in the processor unit, create the virtual manager.

In an embodiment of the invention, the avionic computer architecture comprises at least one sensing unit which detects the data from the physical environment or measures the data, so as to convert them into a signal for use in the operational flight software within the processor unit; and a function providing unit which is an interface and/or hardware of the processor unit and provides data generation for operational flight software located in the processor unit. The sensing unit and the function providing unit create the data supply unit.

In an embodiment of the invention, the avionic computer architecture comprises the virtual interface manager for which the software is updated by the user in case additions, removals and/or modifications are provided for the function providing unit in the air vehicle; the virtual device manager for which the software is updated by the user in case additions, removals and/or modifications are provided for the sensing unit and/or execution unit; the virtual operating manager for which the software is updated by the user in case additions, removals and/or modifications are provided for the operating system. No modification is required for the updated operational flight software with the updates performed by the user for the software of the virtual interface manager, virtual device manager and virtual operating manager, so that the operational flight software is avoided from certification processes and certification is performed only for the virtual interface manager, virtual device manager and/or virtual operating manager which have software parts updated by the user.

In an embodiment of the invention, the avionic computer architecture comprises the virtual interface manager which is created by virtualizing the function providing unit within the processor unit by the user, thus isolating the function providing unit and the processor unit from each other, wherein the virtual interface manager enables data transfer between the operational flight software and the function providing unit by means of the virtual operating manager, wherein since the function providing unit and the processor unit are isolated from each other, if the user makes modifications in the function providing unit, only a part of the virtual interface manager transferring the data received from the modified part in the function providing unit to the operational flight software, is updated. Thus, the virtual interface manager is partially updated by the user and the certification process is performed.

In an embodiment of the invention, the avionic computer architecture comprises the virtual device manager which is created by virtualizing the sensing unit and the execution unit within the processor unit by the user, thus isolating the sensing unit and the execution unit from the processor unit, wherein the virtual device manager enables data transfer between the operational flight software and the sensing unit and the execution unit by means of the virtual operating manager, wherein since the sensing unit and the execution unit are isolated from the processor unit, if the user makes modifications in the sensing unit and/or the execution unit, only a part of the virtual device manager transferring the data received from the modified part in the sensing unit and the execution unit to the operational flight software, is updated. Thus, the virtual device manager is partially updated by the user and the certification process is performed.

In an embodiment of the invention, the avionic computer architecture comprises the virtual operating manager which is created by virtualizing the operating system within the processor unit by the user, thus isolating the operating system and the processor unit from each other, wherein the virtual operating manager allows the data to be converted into a standard format to be read by the updated operational flight software, in order to perform data transfer between virtual interface manager and virtual device manager and operational flight software.

In an embodiment of the invention, the avionic computer architecture comprises the virtual operating manager, which calls and accesses virtual interface managers and virtual device managers to provide data to be used in the process executed in operational flight software.

In an embodiment of the invention, the avionic computer architecture comprises the virtual operating manager for executing the operating system, which enables the data processed in the processor unit, the data measured from the sensing unit, and the data received from the function providing unit to be stored for use in flight software.

In an embodiment of the invention, the avionic computer architecture comprises an avionic computer having the processor unit for executing the operational flight software that enables avionic functions to be performed.

The avionic computer architecture realized to achieve the object of the present invention is illustrated in the attached drawings, in which.

Figure 1:
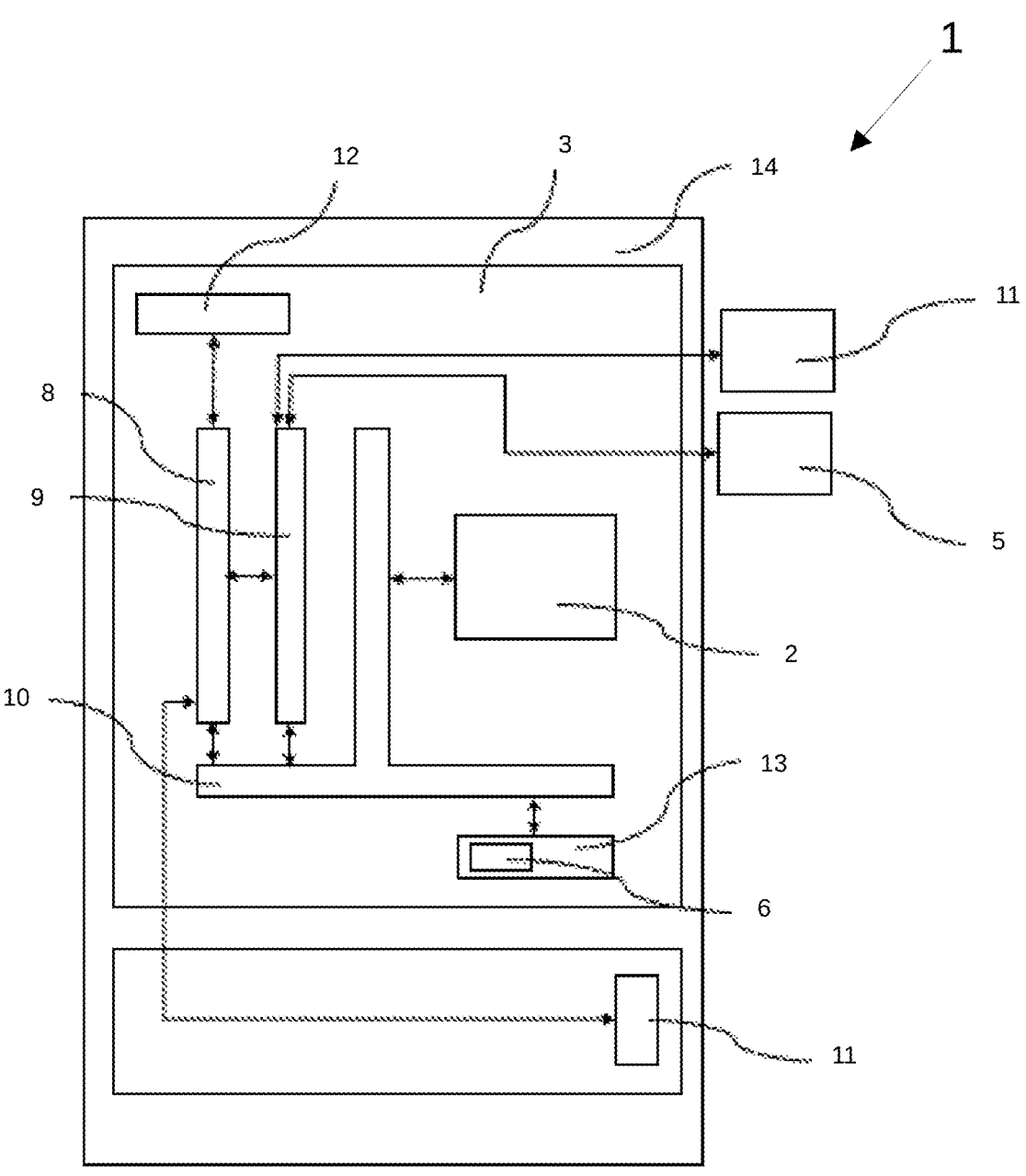
FIG. 1 is a block diagram of an avionic computer architecture.

All the parts in the figures are individually assigned a reference numeral and the corresponding terms of these numbers are listed as follows:

1. Avionic Computer Architecture
2. Operational Flight Software
3. Processor Unit
4. Data Supply Unit
5. Execution Unit
6. Operating System
7. Virtual Manager
8. Virtual Interface Manager
9. Virtual Device Manager
10. Virtual Operating Manager
11. Sensing Unit
12. Function Providing Unit
13. Memory Unit
14. Avionic Computer The avionic computer architecture (1) comprises an operational flight software (2) in air and/or space vehicles, which provides the control and management of avionic systems; at least one processor unit (3) which enables the operational flight software (2) to be processed; at least one data supply unit (4) which receives the data from the physical environment or generates the data, wherein the data is to be used in the operational flight software (2) executed in the processor unit (3); at least one execution unit (5), which enables the execution of commands generated by the operational flight software (2) processed by the processor unit (3); an operating system (6) processed within the processor unit (3), which controls and manages the operational flight software (2), the data supply unit (4), and the execution unit (5).

The avionic computer architecture (1) according to the invention comprises at least one virtual manager (7) which is created by virtualizing at least one of the data supply unit (4), the execution unit (5) and the operating system (6) within the processor unit (3) by a user, and transfers data between the operational flight software (2) and the data supply unit (4), the execution unit (5) and/or the operating system (6), which have been virtualized.

The operational flight software (2), which enables the realization of avionic systems in air and/or space vehicles, is carried out in the processor unit (3). The data supply unit (4), which enables the generation and/or measurement of the data to be used in the operational flight software (2), transmits the data to the operational flight software (2). The operational flight software (2) executed in the processor unit (3) transmits commands to the execution unit (5). The operating system (6), which manages the data accesses and timings and coordinates the operations of the operational flight software (2), the data supply unit (4) and the execution unit (5) providing the execution of the transmitted commands, is carried out in the processor unit (3).

Thanks to the virtual manager (7) created by the virtualizing at least one of the data supply unit (4), the execution unit (5) and the operating system (6) within the processor unit (3) by the user; data exchange is performed between the operational flight software (2) and the data supply unit (4), the execution unit (5) and/or the operating system (6), which have been virtualized by the user. The virtual manager (7) provides data exchange by converting the data transmitted in both directions into the standard format. Thus, the data transmitted to the operational flight software (2) by the data supply unit (4), the execution unit (5) and/or the operating system (6) is converted into a standard format to be processed in the operational flight software (2) by the virtual manager (7) and the command is generated. The command generated by the operational flight software (2) is converted by the virtual manager (7) into the standard format to be processed by the data supply unit (4), the execution unit (5) and/or the operating system (6), so that the avionics function is performed.

Figure 2:
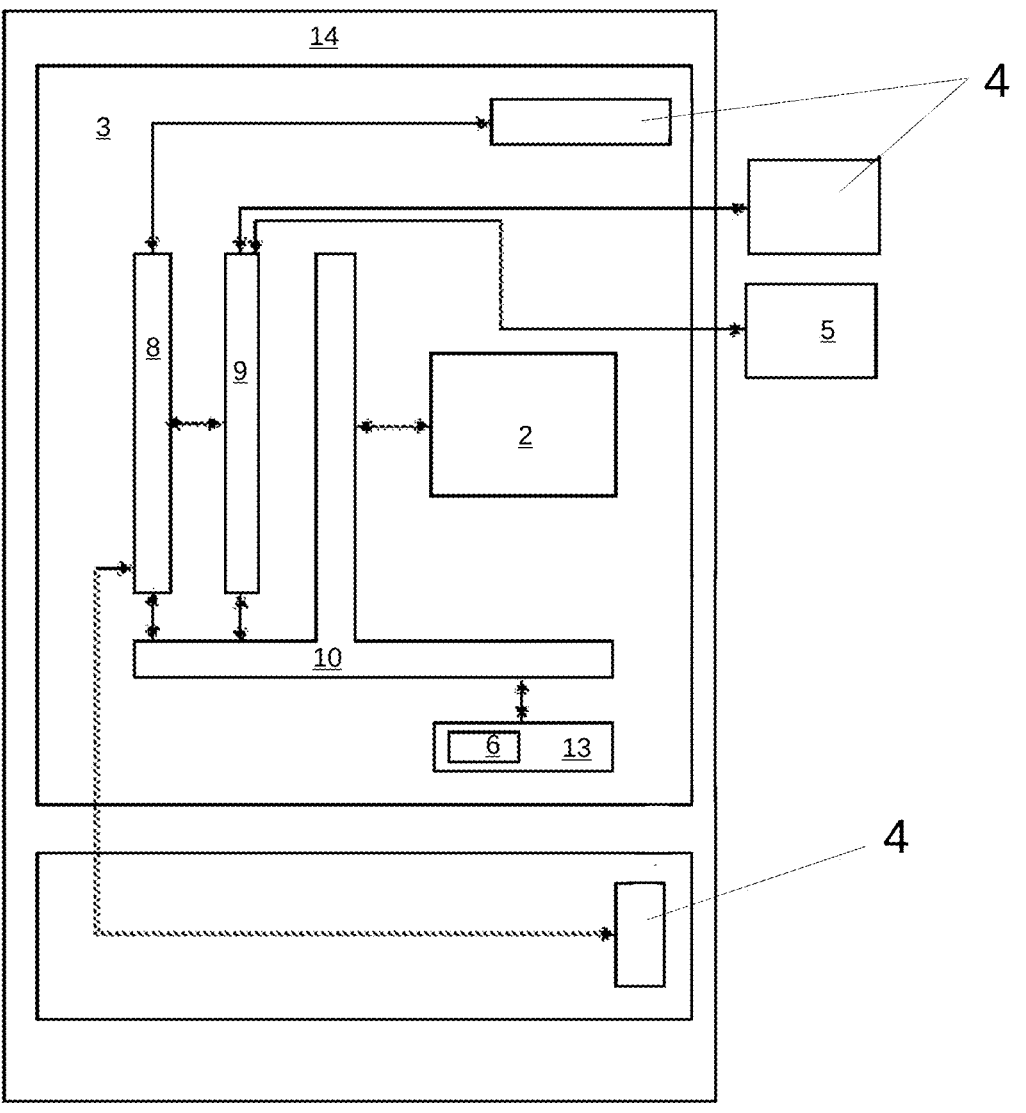
FIG. 2 is a block diagram of an avionic computer architecture.

In an embodiment of the invention, the avionic computer architecture (1) comprises the operational flight software (2) previously updated by the user; the virtual manager (7) created by the virtualization of at least one of the data supply unit (4), the execution unit (5) and the operating system (6) on the processor unit (3), wherein the virtual manager (7) is a different software project/library from the updated operational flight software (2), wherein the virtual manager (7) converts the data into a standard format to be used by an updated operational flight software (2) in order to transfer data between the updated operational flight software (2) and the data supply unit (4), the execution unit (5) and the operating system (6), wherein the virtual manager (7) is subject to certification only for the part that provides data transfer between the updated operational flight software (2) and the part which is added, removed and/or modified by the user for at least one of the data supply unit (4), execution unit (5) and/or operating system (6), so that the certification process is carried out quickly. The operational flight software (2) is updated by the user. There is provided the virtual manager (7), which provides data transfer for the realization of avionic functions between the updated operational flight software (2) and the data supply unit (4), the execution unit (5) and/or the operating system (6), and is created within the processor unit (3) as a separate library from the operational flight software (2) for at least one of the data supply unit (4), the execution unit (5) and the operating system (6). Thanks to the created virtual manager (7), the data is converted into the standard format to be used in the updated operational flight software (2). In case of any hardware or functional modifications/additions/removals on the data supply unit (4), execution unit (5) and/or operating system (6), the virtual manager (7) created by the virtualization of the data supply unit (4), the execution unit (5) and/or the operating system (6) is subject to the certification process, such that certification process is not performed for the updated operational flight software (2). Not all of the virtual manager (7), but only the relevant part of the virtual manager (7) that provides data exchange between the updated operational flight software (2) and the data supply unit (4), execution unit (5) and/or operating system (6) which have been provided with hardware or functional modifications/additions/removals, is updated by the user in software to adapt to hardware or functional modifications/additions/removals and subjected to certification process again, so that the certification process is carried out quickly (Figure-1, Figure-2).

Figure 3:
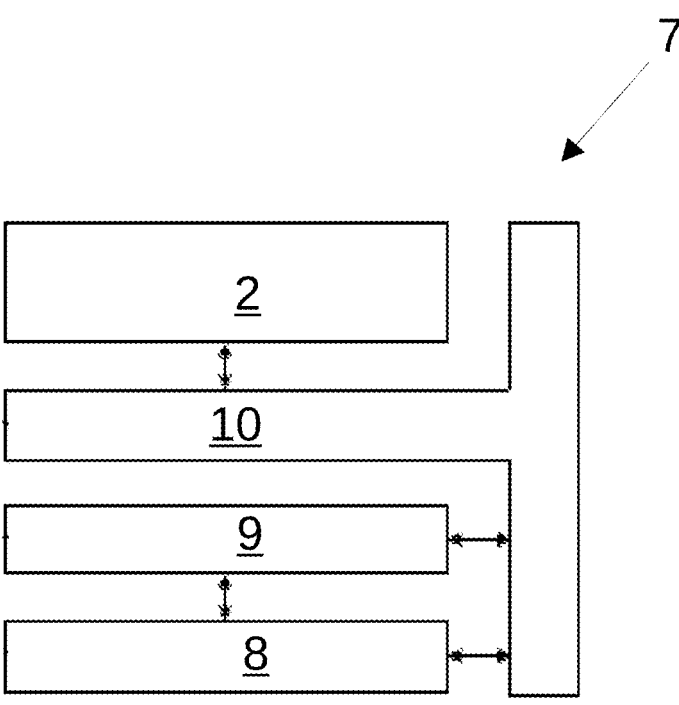
FIG. 3 is a block diagram of a virtual manager.

In an embodiment of the invention, the avionic computer architecture (1) comprises the virtual manager (7) which consists of, sequentially in layers, by at least one virtual interface manager (8) created by the user by virtualizing the data supply unit (4), at least one virtual device manager (9) created by virtualizing the data supply unit (4) and the execution unit (5) and at least one virtual operating manager (10) created by virtualizing the operating system (6). In order for the modifications made in the avionics computer architecture (1) to be carried out quickly, the virtual manager (7) is created in layers by the user within the processor unit (3). With the virtual manager (7), all the interfaces in the processor unit (3) required for the operation of the processor unit (3) and the hardware connected to the processor unit (3) are virtualized. First, the virtual interface manager (8) is created by the user by virtualizing the data supply unit (4) that produces data in the processor unit (3). The data supply unit (4) and the execution unit (5) are managed in the virtual device manager (9), which is created by the user by virtualizing the data supply unit (4) and execution unit (5) including sensors, drivers or all devices that are controlled and receive data, wherein the data required by the operational flight software (2) is interpreted to be standardized. The virtual operating manager (10) created by the virtualization of the operating system (6) located in the processor unit (3) by the user, provides a timing, data access and data management independent from the operating system (6) for the operational flight software (2) (Figure-3).

In an embodiment of the invention, the avionic computer architecture (1) comprises a sensing unit (11) which is connected to the processor unit (3) and enables data to be received from the physical environment; at least one function providing unit (12) which is an interface and/or hardware of the processor unit (3) and enables the generation of data to be used in the flight software (2); the data supply unit (4) consisting of the sensing unit (11) and the function providing unit (12). The data supply unit (4) consists of the sensing unit (11), which enables the data used in the operational flight software (2) to be obtained by measuring from the physical environment, and the function providing unit (12) that enables the data used in the operational flight software (2) to be produced as hardware and/or interface within the processor unit (3).

In an embodiment of the invention, the avionic computer architecture (1) comprises the virtual interface manager (8) for which the software is updated by the user when additions, removals and/or modifications are provided for the function providing unit (12); the virtual device manager (9) for which the software is updated by the user when additions, removals and/or modifications are provided for the sensing unit (11) and/or execution unit (5); and the virtual operating manager (10) for which the software is updated by the user when additions, removals and/or modifications are provided for the operating system (6). In order to transfer data between the function providing unit (12) and the operational flight software (2) as a result of the additions/removals/modifications made by the user in the function providing unit (12), the software of the part of the virtual interface manager (8) that provides data transfer is updated by the user for only the part of the function providing unit (12) for which additions/removals/modifications are made, and the certification process is performed. In order to transfer data between the sensing unit (11) and/or the execution unit (5) and the operational flight software (2) as a result of the additions/removals/modifications made by the user in the sensing unit (11) and/or the execution unit (5), the software of the part of the virtual device manager (9) that provides data transfer is updated by the user for only the part of the sensing unit (11) and/or the execution unit (5) for which additions/removals/modifications are made, and the certification process is performed. In order to transfer data between the operating system (6) and the operational flight software (2) as a result of the additions/removals/modifications made by the user in the operating system (6), the software of the part of the virtual operating manager (10) that provides data transfer is updated by the user for only the part of the operating system (6) for which additions/removals/modifications are made, and the certification process is performed.

In an embodiment of the invention, the avionic computer architecture (1) comprises the virtual interface manager (8) which isolates the function providing unit (12) and the processor unit (3) by virtualizing the function providing unit (12), and provides data transmission to the operational flight software (2) via the virtual operating manager (10). It is ensured that the function providing unit (12) is isolated from (8) the processor unit (3) via the virtual interface manager (8) and that the function providing unit (12) is independent from the processor unit (3). Data transfer from the function providing unit (12) to the operational flight software (2) is provided by the virtual interface manager (8) converting the data into standard format and transmitting it via the virtual operating manager (10).

In an embodiment of the invention, the avionic computer architecture (1) comprises the virtual device manager (9), which isolates the sensing unit (11) and execution unit (5) from the processor unit (3) by virtualizing the sensing unit (11) and the execution unit (5), and provides data transmission to the operational flight software (2) via the virtual operating manager (10). It is ensured that the sensing unit (11) and the execution unit (5) are isolated from the processor unit (3) via the virtual device manager (9), thus ensuring that the sensing unit (11) and the execution unit (5) are independent from the processor unit (3). Data transfer from the sensing unit (11) and the execution unit (5) to the operational flight software (2) is provided by the virtual device manager (9) converting the data into standard format and transmitting it via the virtual operating manager (10).

In an embodiment of the invention, the avionic computer architecture (1) comprises the virtual operating manager (10) which isolates the operating system (6) and the processor unit (3) by virtualizing the operating system (6), and provides data transmission between the operational flight software (2) and the virtual interface manager (8) and between the operational flight software (2) and the virtual device manager (9). Thanks to the virtual operating manager (10) created by the virtualization of the operating system (6), it is possible to use the operational flight software (2) with another operating system (6) or without any operating system (6). The calls of the data required for the operational flight software (2) are performed through the virtual interface manager (8) and virtual device manager (9) by means of the virtual operating manager (10).

In an embodiment of the invention, the avionic computer architecture (1) comprises the virtual operating manager (10) which enables transmission of the data required for the operation executed by the operational flight software (2), and provides access to virtual interface managers (8) and virtual device managers (9). The virtual operating manager (10) is created in parallel with the virtual interface manager (8) and the virtual device manager (9). In this way, the data required for the operational flight software (2) is transmitted from the virtual interface manager (8) and virtual device manager (9) via the virtual operating manager (10).

In an embodiment of the invention, the avionic computer architecture (1) comprises at least one memory unit (13) running the operating system (6) therein, which stores the data processed by the processor unit (3) and obtained by the sensing unit (11) and the function providing unit (12), and enables the stored data to be transmitted to the operational flight software (2) for use when necessary. Thanks to the virtual operating manager (10), the operational flight software (2) can access the data in the memory unit (13) independently of the memory structure of the operating system (6) and the processor unit (3).

In an embodiment of the invention, the avionic computer architecture (1) comprises an avionic computer (14) having the processor unit (3). Operational flight software (2), which provides the realization of avionic functions, is carried out by the processor unit (3) located in the avionic computer (14).

The invention claimed is:

1. An avionic computer architecture (1) comprising:
   an operational flight software (2) in air and/or space vehicles, which provides the control and management of avionic systems;
   a processor unit (3) which enables the operational flight software (2) to be processed;
   a data supply unit (4) which receives data from a physical environment or generates data, wherein the data is to be used in the operational flight software (2) executed in the processor unit (3), wherein the data supply unit (4) comprises one or more sensors configured to receive data from a physical environment;
   an execution unit (5), which enables the execution of commands generated by the operational flight software (2) processed by the processor unit (3), wherein the execution unit (5) comprises one or more actuators, control interfaces, and processor-executable control logic;
   an operating system (6) processed within the processor unit (3), which controls and manages the operational flight software (2), the data supply unit (4), and the execution unit (5); and
   a virtual manager (7) which is created by virtualizing at least one of the data supply unit (4), the execution unit (5) and the operating system (6) within the processor unit (3) by a user, and transfers data between the operational flight software (2) and the data supply unit (4), the execution unit (5) and/or the operating system (6), which have been virtualized; and
   wherein the operational flight software (2) is previously updated by the user, wherein the virtual manager (7) is created by the virtualization of at least one of the data supply unit (4), the execution unit (5) and the operating system (6) on the processor unit (3), wherein the virtual manager (7) is a different software project/library from the updated operational flight software (2), wherein the virtual manager (7) converts the data into a standard format to be used by an updated operational flight software (2) in order to transfer data between the updated operational flight software (2) and the data supply unit (4), the execution unit (5) and the operating system (6), wherein the virtual manager (7) is subject to certification only for a part that provides data transfer between the updated operational flight software (2) and the part which is added, removed and/or modified by the user for at least one of the data supply unit (4), execution unit (5) and/or operating system (6), so that the certification process is carried out quickly.

2. The avionic computer architecture (1) according to claim 1, wherein the virtual manager (7) consists of, sequentially in layers, by at least one virtual interface manager (8) created by the user by virtualizing the data supply unit (4), at least one virtual device manager (9) created by virtualizing the data supply unit (4) and the execution unit (5) and at least one virtual operating manager (10) created by virtualizing the operating system (6).

3. The avionic computer architecture (1) according to claim 2, wherein the data supply unit (4) comprises the one or more sensors and an interface to the processor unit (3).

4. The avionic computer architecture (1) according to claim 3, wherein the virtual interface manager (8) is configured such that software thereof is updated by a user when additions, removals, and/or modifications are made to an interface between the data supply unit (4) and the processor unit (3); wherein the virtual device manager (9) is configured such that software thereof is updated by the user when additions, removals, and/or modifications are made to the one or more sensors of the data supply unit (4) and/or the execution unit (5); and wherein the virtual operating manager (10) is configured such that software thereof is updated by the user when additions, removals, and/or modifications are made to the operating system (6).

5. The avionic computer architecture (1) according to claim 3, wherein the virtual interface manager (8) isolates the interface to the processor unit (3) and the processor unit (3) by virtualizing the interface to the processor unit (3), and provides data transmission to the operational flight software (2) via the virtual operating manager (10).

6. The avionic computer architecture (1) according to claim 3, wherein the virtual device manager (9) isolates the one or more sensors and execution unit (5) from the processor unit (3) by virtualizing the one or more sensors and the execution unit (5), and provides data transmission to the operational flight software (2) via the virtual operating manager (10).

7. The avionic computer architecture (1) according to claim 3, comprising at least one memory unit (13) running the operating system (6) therein, which stores data processed by the processor unit (3) and obtained by the one or more sensors and the interface to the processor unit (3), and enables the stored data to be transmitted to the operational flight software (2).

8. The avionic computer architecture (1) according to claim 2, wherein the virtual operating manager (10) isolates the operating system (6) and the processor unit (3) by virtualizing the operating system (6), and provides data transmission between the operational flight software (2) and the virtual interface manager (8) and between the operational flight software (2) and the virtual device manager (9).

9. The avionic computer architecture (1) according to claim 2, wherein the virtual operating manager (10) enables transmission of the data required for the operation executed by the operational flight software (2), and provides access to virtual interface managers (8) and virtual device managers (9).

10. The avionic computer architecture (1) according to claim 1, comprising an avionic computer (14) having the processor unit (3).

* * * * *